March 27, 1956     R. T. CORNELIUS     2,739,611
COMBINATION REGULATING AND RELIEF VALVES
Filed Feb. 28, 1952

Inventor
RICHARD T. CORNELIUS

By Caswell & Lagaard

ATTORNEYS

# United States Patent Office 2,739,611
Patented Mar. 27, 1956

2,739,611

COMBINATION REGULATING AND RELIEF VALVES

Richard T. Cornelius, Minneapolis, Minn.

Application February 28, 1952, Serial No. 273,890

2 Claims. (Cl. 137—505.15)

The herein disclosed invention relates to combination regulating and relief valves and has for an object to provide a valve which can be manufactured at an economical cost.

Another object of the invention resides in providing a valve using ball type valve members and in which the valve members are positively unseated from the valve seats.

Another object of the invention resides in providing a construction in which the pressure on the valve member is equalized so that uniformity of pressure can be maintained.

A further object of the invention resides in providing the valve with a body having a socket therein and in disposing within said socket an insert formed with an inlet chamber.

Another object of the invention resides in constructing the body with an outlet chamber and in providing in the body and in the insert a passageway adapted to communicate with the inlet and outlet chambers.

A still further object of the invention resides in providing an inlet communicating with the inlet chamber and an outlet communicating with the outlet chamber.

An object of the invention resides in forming in the insert a valve seat at the intersection of said passageway with the inlet chamber and in further providing a ball valve member disposed in said inlet chamber and adapted to seat against said seat.

Another object of the invention resides in forming in said insert a bore and in slidably mounting in said bore a piston adapted to engage the valve member and in further constructing said bore of a cross sectional area equal to the area of the valve seat.

A feature of the invention resides in providing a diaphragm extending across said body and forming a portion of the outlet chamber and in further attaching to the diaphragm a piston assembly adapted to be urged by means of an adjustable spring in a direction to resist the pressure in said outlet chamber.

Another object of the invention resides in providing an ejector on the piston assembly adapted to extend through said passageway and to unseat said valve member when the pressure in the outlet chamber diminishes.

Another object of the invention resides in providing a passageway in said piston assembly communicating with the outlet chamber and a vent in the piston assembly adapted to communicate with said passageway and with the exterior and formed at its intersection with the passageway with a valve seat and in further providing a ball valve member adapted to seat against said seat to prevent escape of fluid from the outlet chamber.

An object of the invention resides in providing an ejector adjustably mounted with reference to said body and adapted to enter said vent to unseat said valve member when the pressure in said outlet exceeds a predetermined value.

Other objects of the invention reside in the novel combination and arrangement of parts and in the details of construction hereinafter illustrated and/or described.

Figure 1:
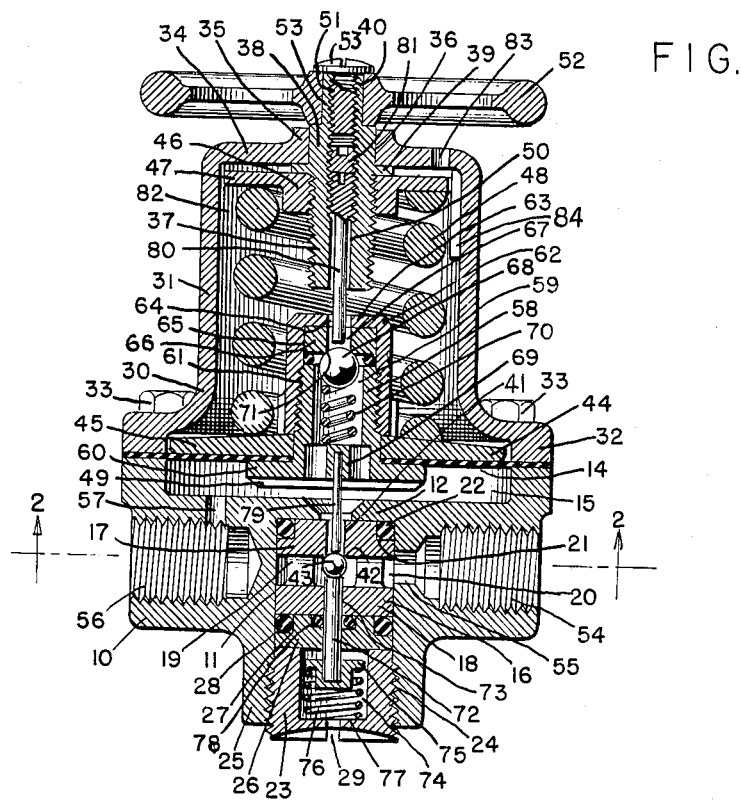
Fig. 1 is an elevational sectional view of a valve illustrating an embodiment of the invention and taken on line 1—1 of Fig. 2.

The construction shown in the drawings comprises a valve body having a socket therein and in which is disposed an insert formed with an inlet chamber. In said body is formed a cavity overlying which is a diaphragm and forming with said body at said cavity an outlet chamber. In the body and in said insert is a passageway adapted to bring the inlet chamber into communication with the outlet chamber. A ball valve normally seated against a valve seat formed at the intersection of the passageway and inlet chamber normally closes communication between the inlet and outlet chambers. The body is provided with an inlet communicating with the inlet chamber and an outlet communicating with the outlet chamber. Mounted on the diaphragm is a cap which clamps the diaphragm in position. A piston assembly is attached to the diaphragm and has a passageway communicating with the outlet chamber. In this piston assembly is a vent which is adapted to communicate with the last named passageway and the interior of said cap which is vented to the exterior. A ball valve member disposed within said second named passageway is adapted to seat against a valve seat formed at the intersection of said vent and said second named passageway and prevents flow of fluid outwardly from the outlet chamber. Attached to a part of the piston assembly is an ejector which extends into the first named passageway and is adapted to unseat the ball valve member when the piston assembly is moved toward said ball valve member. A compression coil spring seated against said cap and against said piston assembly urges the diaphragm in a manner to unseat said ball. An adjusting screw mounted in the cap serves to vary the tension of said spring and carries an ejector adapted to extend through the second named passageway and to unseat said second named ball valve member when the pressure in the outlet chamber reaches a value sufficient to move the diaphragm in the opposite direction. By means of the first named ejector a constant pressure is maintained in the outlet chamber. By means of the second named ejector excessive pressure in the outlet chamber is relieved through the vent in the piston assembly by means of the second named ejector.

The invention comprises a body 10 in the form of a casting which is constructed with a cylindrical socket 11 in the lower portion of the same. Above this socket is a partition 12 and above this partition is an outlet chamber 15. Overlying the upper portion of the body 10 at the locality of the outlet chamber 15 is a diaphragm 14 which closes said outlet and forms one of the walls thereof.

Figure 2:
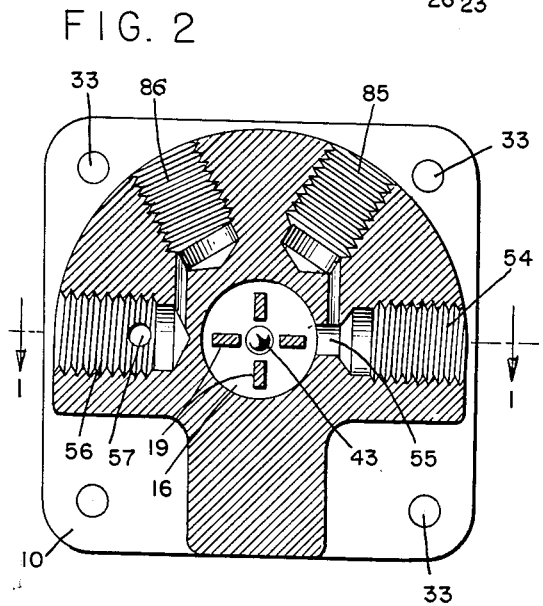
Fig. 2 is an inverted plan sectional view taken on line 2—2 of Fig. 1.

In the socket 11 is disposed an insert 16 which comprises two platelike portions 17 and 18 separated by means of struts 19 best shown in Fig. 2. This construction provides a space between the platelike portions 17 and 18 which forms an inlet chamber designated by the reference character 20. The partition 12 and the platelike portion 17 of insert 16 are formed with a passageway 41 which is adapted to bring the inlet chamber 20 into communication with the outlet chamber 15. The body 10 is formed with an inlet 54 which communicates through a passageway 55 with the inlet chamber 20. The body 10 is further formed with an outlet 56 which communicates through a passageway 57 with the outlet chamber 15. The platelike portion 17 is formed with a rabbet 21 in which is disposed an O-ring 22 forming a seal between the partition 12 and the insert 16. This O-ring engages the end of the socket 11 as well as the cylindrical wall thereof. The insert 16 is held within the socket 11 by means of a plug 23 screwed into threads 24 formed in a boss 25 at the lower end of the body 10. This plug screws against a thick washer 26 which is formed with a rabbet 27 in which another O-ring 28 is mounted. The O-ring 28 engages the under surface of the platelike portion 18 of insert 16 as well as the cylindrical wall of the socket 11. This forms a fluid tight seal between the insert 16 and the body 10 and prevents flow of fluid in either direction from the chamber 20 along the cylindrical surface of the socket 11. Plug 23 is formed with a screw driver slot 29 by means of which the same may be tightened down.

The diaphragm 14 is held attached to the body 10 by means of a cap 30 having a bell shaped portion 31 with a flange 32 extending outwardly from the lower edge thereof. This flange overlies the diaphragm 14 and cap screws 33 extending through said flange and threaded into body 10 hold the cap mounted on the body and also clamp the diaphragm in position. The cap 31 has an end wall 34 which is provided with a boss 35 formed with a bore 36. A screw 37 has a journal 38 which is rotatably mounted in the bore 36. A collar 39 extending outwardly from said journal engages the underside of the boss 35 and restrains outward movement of the screw 37 through the bore 36. The outer end of the screw 37 is formed with a stem 40. The screw 37 is disposed at right angles to the diaphragm 14 and lies in alignment with the passageway 41 between the inlet chamber 20 and the outlet chamber 15.

Mounted on the diaphragm 14 is a piston assembly 44 which includes a follower plate 45. Screwed on the screw 37 is a nut 46 which has a flange 47 issuing outwardly therefrom. A compression coil spring 48 is disposed between the follower plate 45 and the flange 47 and urges the piston structure and diaphragm outwardly toward the partition 12. A spline 84 on the cap 30 holds the nut 46 from rotation.

The screw 37 has a hole 50 extending longitudinally completely through the same. The upper portion of this hole is threaded as indicated at 51. Mounted on the stem 40 is a hand wheel 52 which is held attached to the screw by means of a machine screw 53 which is threaded into the threads 51. Suitable splines, not shown, are disposed between the hand wheel and the stem 40 and restrain relative rotation therebetween.

The piston assembly 44 further includes a bushing 58 which has a bore 59 extending through the same. This bushing extends through the follower 45 and through the diaphragm 14 and has a flange 60 at the lower end of the same which engages the underside of the diaphragm 14. This flange is formed with stops 49 which are adapted to engage the upper surface of the partition 12 and limit downward movement of the diaphragm 14 when the valve is disconnected from the source of fluid pressure with which it is to be used. This construction prevents injury to the diaphragm. The bushing 58 is formed with threads 61 and screwed on these threads is a tubular nut 62. This nut has an end wall 63 which is formed with a bore 64. The upper end of the said nut is constructed with a socket 65 cylindrical in form and which receives an insert 66. Insert 66 has a passageway 67 therein forming a continuation of bore 59 of nut 58 and is in direct communication with the outlet chamber 15. The intersection of the passageway 67 with the bore 59 forms a valve seat 71 against which a ball valve member 68 is seated. The lower end of the passageway 67 has extending across it a bridge 69. Seated against this bridge and engaging the ball 68 is a compression coil spring 70 which maintains the said ball against the seat 71 formed on the insert 66.

The ball valve member 43 is held against the seat 42 by means of a piston 72 engagable therewith and slidable along a bore 73 formed in the platelike portion 18 of insert 16 and in the washer 26 and in axial alignment with the passageway 41. This piston and the bore 73 are of the same cross sectional area as the area of the valve seat 42. The end of the piston 72 extends into a socket 74 in plug 23 and has attached to its end a spring seat 75. A compression coil spring 76 is seated against this spring seat and against the end 77 of the plug 23 formed by the socket 74. This spring urges the piston in a direction to hold the ball valve member 43 seated on the seat 42. An O-ring 78 carried by the washer 26 forms a fluid tight connection between the piston and the said washer.

Attached to the bridge 69 is an ejector pin 79 which extends through the passageway 41 and into close proximity to the ball valve member 43. When the pressure in chamber 15 drops, spring 48 urges the diaphragm 14 downwardly and ejector pin 79 unseats the ball valve member 43 from its seat 42 and allows fluid to pass through the passageway 41 and into the outlet chamber 15.

In the body 10 are formed two tapped openings 85 and 86 which communicate with the inlet 54 and outlet 56. Pressure gages may be screwed into said openings, or when gages are not desired, ordinary pipe plugs may be screwed into the same to close said openings.

In the threads 51 of screw 37 is screwed an ejector pin 80 which extends through the passageway 67 and into close proximity to the ball valve member 68. This ball valve member is held in adjusted position within said threads by means of a set screw 81. The ejector pin 80 is adapted to engage the ball valve member 68 when the pressure in chamber 15 produces a force greater than that of the spring 48 and moves the diaphragm 14 upwardly. This unseats the said ball valve member and allows the fluid in chamber 15 to escape through the passageway 67 and into the chamber 82 formed in the interior of the cap 30. A hole 83 in the end wall 34 of said cap vents the escaping fluid to the exterior.

The method of operation of the invention is as follows: Fluid enters the inlet chamber 20 through the inlet 54 and passageway 55. Spring 76 acting on spring seat 75 normally urges the piston 72 against ball valve member 43 and closes the passageway 41. If the pressure in chamber 15 is below normal the diaphragm 14 is forced downwardly by spring 48 and ejector pin 79 forces the ball valve 43 off from the seat 42. Fluid now passes through passageway 41 into chamber 15 and through passageway 57 into outlet 56 until the pressure in said chamber builds up sufficiently to withdraw the ejector pin 79. Ball valve member 43 now reseats on seat 42 and the valve closes. If the pressure in chamber 15 should rise above a predetermined value the diaphragm 14 is moved upwardly. This causes ejector pin 80 to engage the ball valve member 68 which unseats said ball valve member from the seat 71. The pressure in chamber 14 is relieved through the passageway 67 and escapes into chamber 82 from which it passes through hole 83 to the exterior. When the pressure has been relieved diaphragm 14 again resumes its original position and the ball valve member 68 again closes the valve. Spring 76 exerts a force on piston 72 and valve member 43 greater than the force exerted on said piston by means of the pressure in chamber 20. This force is reduced by the pressure in chamber 20 acting on piston 72. The force on valve member 43 exerted by spring 48 overcomes the force exerted on said valve member by piston 72 as well as the force exerted on said valve member by the pressure in the inlet chamber. Should the pressure in inlet chamber 20 decrease, the reduction in the force from the fluid pressure exerted on valve member 43 would be a function of the area of valve seat 42 and said reduction in pressure. Correspondingly, the reduction in pressure on the piston 43 would be the same since the area of piston 72 is equal to the area of valve seat 42. Spring 76 is now able to exert an increased force on valve member 43, the increase being equal to the decrease in force on the piston 72 and the corresponding decrease on the valve member 43. Thus the force required to unseat valve member 43 is independent of the pressure in chamber 20.

The advantages of the invention are manifest. The device is extremely simple in construction and can be fabricated at an exceedingly low cost. The valve members are positively unseated when the pressures exceed or fall below the desired value. Adjustment of the pressure regulating portion of the valve to procure the desired pressure is accomplished by means of a construction in which the screw extends outwardly beyond the valve body the same amount regardless of the adjusted position of the same. With the instant invention the valve structure forms a pressure regulating as well as a relief valve and with relatively few additional parts.

Changes in the specific form of the invention, as herein described, may be made within the scope of what is claimed without departing from the spirit of the invention.

Having described the invention, what is claimed as new and desired to be protected by Letters Patent is:

1. In a pressure regulating valve, a body having an inlet chamber, an inlet communicating therewith, an outlet chamber and an outlet communicating therewith and a passageway extending between said inlet chamber and said outlet chamber, a valve seat encircling said passageway at the intersection of said passageway with said inlet chamber and facing said inlet chamber, a floating valve member disposed in said inlet chamber and adapted to seat against said valve seat, a bore in said body opposite said valve seat and in communication with the exterior, a piston slidable in said bore and disconnected from said valve member, said piston being adapted to contact said valve member, resilient means carried by said body and urging said piston into contact with said valve member to effect seating of said valve member against said seat, said bore being of substantially the same cross sectional area as the area of the outer confines of the contacting portion of said valve seat said resilient means exerting a force on said piston greater than the maximum force exerted by the fluid pressure on the valve member to maintain said piston in contact with said valve member and pressure responsive means subject to the pressure in said outlet chamber and engageable with said valve member to unseat the same in correspondence with variations in pressure in said outlet chamber to regulate the pressure therein.

2. In a pressure regulating valve, a body having an inlet chamber, an inlet communicating therewith, an outlet chamber and an outlet communicating therewith and a passageway extending between said inlet chamber and said outlet chamber, a valve seat encircling said passageway at the intersection of said passageway with said inlet chamber and facing said inlet chamber, a ball disposed in said inlet chamber and adapted to seat against said valve seat, a bore in said body opposite said valve seat and in communication with the exterior, a piston slidable in said bore and disconnected from said ball and adapted to contact said ball, resilient means carried by said body and urging said piston into contact with said ball to effect seating of said ball against said seat, said bore being of substantially the same cross sectional area as the area of the outer confines of the contacting portion of said valve seat said resilient means exerting a force on said piston greater than the maximum force exerted by the fluid pressure on the ball to maintain said piston in contact with said ball and pressure responsive means subject to the pressure in said outlet chamber and engageable with said ball to unseat the same in correspondence with variations in pressure in said outlet chamber to regulate the pressure therein.

References Cited in the file of this patent

UNITED STATES PATENTS

| Number | Name | Date |
|---|---|---|
| 80,066 | Gibson | July 21, 1868 |
| 1,050,036 | Mueller | Jan. 7, 1913 |
| 1,178,528 | Loepsinger | Apr. 11, 1916 |
| 1,595,809 | Nichols | Aug. 10, 1926 |
| 1,706,230 | Hilger | Mar. 19, 1929 |
| 2,156,823 | Stettner | May 2, 1939 |
| 2,212,626 | Thomas | Aug. 27, 1940 |
| 2,230,718 | Gannestad | Feb. 4, 1941 |
| 2,252,152 | Work | Aug. 12, 1941 |
| 2,287,992 | Grove | June 30, 1942 |
| 2,564,686 | Gray | Aug. 21, 1951 |
| 2,645,450 | Chessman | July 14, 1953 |
| 2,664,674 | Niesemann | Jan. 5, 1954 |